United States Patent [19]
Naka

[11] Patent Number: 6,151,176
[45] Date of Patent: Nov. 21, 2000

[54] MAGNETIC HEAD ATTACHMENT STRUCTURE IN A PHOTOGRAPHIC FILM APPARATUS

[75] Inventor: Haruyuki Naka, Wakayama, Japan

[73] Assignee: Noritsu Koki Co., Ltd., Wakayama, Japan

[21] Appl. No.: 09/082,470

[22] Filed: May 21, 1998

[30] Foreign Application Priority Data

May 21, 1997 [JP] Japan .................................... 9-130919

[51] Int. Cl.⁷ ................................................ G11B 5/633
[52] U.S. Cl. .............................. 360/3; 360/128; 360/251; 360/130.31
[58] Field of Search .................... 360/130.33, 130.32, 360/130.31, 130.3, 128, 1, 3, 109, 105, 104, 250, 251; 396/320, 319, 312; 369/71

[56] References Cited

U.S. PATENT DOCUMENTS

| | | |
|---|---|---|
| 5,285,324 | 2/1994 | Weigand et al. . |
| 5,448,321 | 9/1995 | Matsukawa . |
| 5,481,322 | 1/1996 | Wakabayashi ......................... 396/320 |
| 5,568,212 | 10/1996 | Shimizu . |
| 5,781,810 | 7/1998 | Wakabayashi ......................... 396/320 |
| 5,802,409 | 9/1998 | Brock et al. ............................ 396/319 |
| 5,950,026 | 9/1999 | Jessop .................................... 396/319 |

FOREIGN PATENT DOCUMENTS

0363849  4/1990  European Pat. Off. .

*Primary Examiner*—Alan T. Faber
*Attorney, Agent, or Firm*—Smith Patent Office

[57] ABSTRACT

A magnetic head attachment structure for a photographic film comprises a head unit for supporting magnetic heads which read and/or write magnetic information to or from the photographic film. The magnetic head attachment structure also includes a pressure unit for supporting bubble springs which press a magnetic recording surface of the photographic film to the magnetic heads. The bubble springs have a first condition where they are able to contact with the magnetic heads allowing the film to pass therebetween and a second condition where they are able to be selectively apart from the magnetic heads so that a pressure unit is able to rotate around the head unit on a shaft.

11 Claims, 11 Drawing Sheets

MAGNETIC HEAD ATTACHMENT STRUCTURE IN A PHOTOGRAPHIC FILM APPARATUS

BACKGROUND OF THE INVENTION

1. Field of the Invention

The present invention relates to a magnetic head attachment structure for a photographic film apparatus. More specifically, the invention relates to an improved magnetic head attachment structure for allowing an easy cleaning operation of the magnetic head.

2. Discussion of the Related Art

In general, a film transfer unit is adopted to process a photographic film for a photographic exposure apparatus. The transfer unit comprises a transfer path for transferring the film, an opening portion for positioning a picture frame of the film, etc. Further, a magnetic head device for reading or writing magnetic data is provided for processing the film having a magnetic record portion as represented by an advanced photographic system.

Such a magnetic head device for photographic film is disclosed, for example, in U.S. Pat. No. 5,285,324. In this patent, the magnetic head device comprises a housing 14 for attaching a magnetic reading and/or writing element, a mount block provided with a flexible plate for pressing the film to the element and a resilient pad, a loading spring, and a support plate for attaching the housing and the mount block.

In the case of a photographic film having a magnetic record portion, since a magnetic layer or a protection layer for protecting the magnetic layer may be peeled off while transferring the photographic film and one or both layers may stick to the magnetic head, there is a problem that the reading or writing accuracy of the magnetic head goes down.

Therefore, the magnetic head must be cleaned periodically by transferring a cleaning leader, formed of a similar shape as the film, along the film transfer path.

Especially in the case when the magnetic head is more contaminated, it is necessary to clean the magnetic head with a cotton swab that has been permeated with alcohol or the like.

However, in the case of the above mentioned prior patent it is very difficult to clean the magnetic head, since the flexible plate and the elastic pad obstruct the cleaning operation and it is necessary to remove the housing or the mount block from the support plate to clean the head. There is also a danger that the user may cut a lead wire if the user tries such a difficult operation. Therefore, as a practical matter it is really impossible for the user to deal with this problem when the magnetic head becomes more contaminated.

SUMMARY OF THE INVENTION

It is a first object of the present invention to provide a magnetic head attachment structure for a photographic film that allows an easy cleaning operation compared to the above mentioned prior art. More specifically, it is an object to provide a magnetic head attachment structure for a photographic film that will allow cleaning the magnetic head with a cotton swab or the like when the magnetic head is stained or contaminated.

In order to achieve the above mentioned object, the present invention provides a magnetic head attachment structure for a photographic film, which comprises a head unit for supporting a magnetic head so as to read and/or write magnetic information to or from a photographic film, a pressure member for pressing a magnetic record surface of the photographic film to the magnetic head, a pressure unit for supporting the pressure member; and the pressure member having a first position in contact with the magnetic head and a second position spaced apart from the magnetic head so that the relative positional relationship between the head unit and the pressure unit can change.

According to the above mentioned structure, the magnetic head is able to read or write by passing the film through when the pressure member is in the first position. Since the pressure member contacts the magnetic head in this first position, it is impossible to clean the head with the cotton swab or the like. It is enough to change the relative spacial relationship between the head unit and the pressure unit from the first position to a second position where it may be cleaned with the cotton swab. Since in the second position the magnetic head is spaced apart from the pressure member and the pressure member is moved so that it does not to obstruct the cleaning operation, it is easy to clean the magnetic head when it is in the second position.

Further, according to the above mentioned structure in the present invention, since the magnetic head and the pressure member become a unit respectively, it is easy to change the relative positional relationship between the head unit and the pressure unit.

Therefore, the magnetic head attachment structure for the photographic film is able to be provided so that the cleaning operation can easily be done with the cotton swab or the like when the magnetic head is stained or contaminated.

The preferred structure that enables the change between the first position and the second position comprises a holding member for holding the head unit and the pressure unit at the first position. It is possible to change their positions by operating this holding member.

According to the above mentioned structure, it is possible to change the head unit and the pressure unit to a second position condition after releasing a holding condition by operating the holding member. In other words, it is possible to change to the second position by a simple operation of the holding member and thereby allow cleaning of the magnetic head with the cotton swab or the like.

Further, the preferred structure of the holding member comprises a fixing portion fixed to the head unit, an engaging portion for engaging the pressure unit, and a deformable portion that is elastically deformable and connects the fixing portion and the engaging portion to each other.

According to the above mentioned structure, the head unit and the pressure unit are usually engaged with each other by the holding member so as to be held in the first position. It is possible to change from the first position to the second position by operating the engaging portion so that both units are changed to a disengaged position. Especially since the deformable portion for connecting the fixing portion and the engaging portion to each other is provided, it is possible to easily change positions from the engaged position to the disengaged position by elastically deforming the deformable portion when operating the engaging portion. Further, since the holding member is fixed to the head unit, there is no danger to miss the holding member while performing the cleaning operation.

It is a second object of the present invention to provide a magnetic head attachment structure for a photographic film so as to provide an easier cleaning operation with a cotton swab or the like by spacing the magnetic head apart from the transfer path of the photographic film when changing the relative positional relationship between the head unit and the pressure unit.

In order to achieve the above mentioned object, the present invention provides a magnetic head attachment structure, where the head unit is preferably able to move between a first position where the magnetic head faces a transfer path of the photographic film and a second position which is spaced apart from the transfer path.

It is a third object of the present invention to provide a magnetic head attachment structure for a photographic film that provides an easy cleaning operation by spacing the magnetic head apart from a pressure member after moving a magnetic head from a transfer path of the photographic film.

In order to achieve the above mentioned object, the present invention provides a magnetic head attachment structure, where the head unit is preferably moveable from one position to another position while keeping the first position where the head unit is connected with the pressure unit.

In other words, both units are moved from one position to another position while keeping both units connected to each other before first changing the relative positional relationship between both units. Then, the relative positional relationship between both units is changed from the first position to the second position when they have reached the another position.

It is a fourth object of the present invention to provide a magnetic head attachment structure for a photographic film that is capable of reading and/or writing magnetic data on a film being transferred where the head unit is secured in a first position and to provide an easy cleaning operation with a cotton swab or the like without supporting a head unit by hand at another position.

In order to achieve the above mentioned object, the present invention provides a magnetic head attachment structure, which comprises, for example, a head unit attachment member that is able to secure the head unit at both the first position and the second position.

It is a fifth object of the present invention to provide a magnetic head attachment structure for a photographic film having a simple structure compared to a structure having a relative sliding motion by changing the position from a first position to a second position so that the head unit is rotated around a pressure unit.

In order to achieve the above mentioned object, the present invention provides a magnetic head attachment structure capable of rotating around a support shaft of the pressure unit.

It is a sixth object of the present invention to provide a magnetic head attachment structure for a photographic film capable of changing a condition of a pair of head units easily from a first condition to a second condition by attaching the pair of the head units to a common attachment member so that the pair of the head units are adapted for an arrangement of a magnetic track. Further, with this structure it is easy to get relative positional accuracy with the pair of head units.

In order to achieve the above mentioned object, the present invention provides a magnetic head attachment structure comprising a pair of head units provided along a direction perpendicular to a transfer direction of a photographic film, an attachment member for attaching a pair of head units, and the head units preferably being secured to a head unit fixing member through the attachment member.

A pair of magnetic tracks of the photographic film of an advanced photographic system are provided on both sides of a picture area and along a direction perpendicular to the transfer direction in accordance with regulations.

It is a seventh object of the present invention to provide a magnetic head attachment structure for a photographic film that is able to easily achieve relative positional accuracy between a magnetic head for reading and a magnetic head for writing by changing the magnetic head for reading and the magnetic head for writing from the first condition to the second condition at the same time.

In order to achieve the above mentioned object, the present invention provides a magnetic head attachment structure capable of attaching the magnetic head for reading and the magnetic head for writing to the head unit.

Other characteristic features and effects of the present invention will become obvious by the description of the embodiments below with reference to the drawings.

BRIEF DESCRIPTION OF THE DRAWINGS

The above objects and features of the present invention will be clearly understood from the following description with respect to preferred embodiments thereof when considered in conjunction with the accompanying drawings, wherein the same reference numerals have been used to denote the same or similar parts or elements, and in which.

DETAILED DESCRIPTION OF THE PREFERRED EMBODIMENTS

Figure 1:
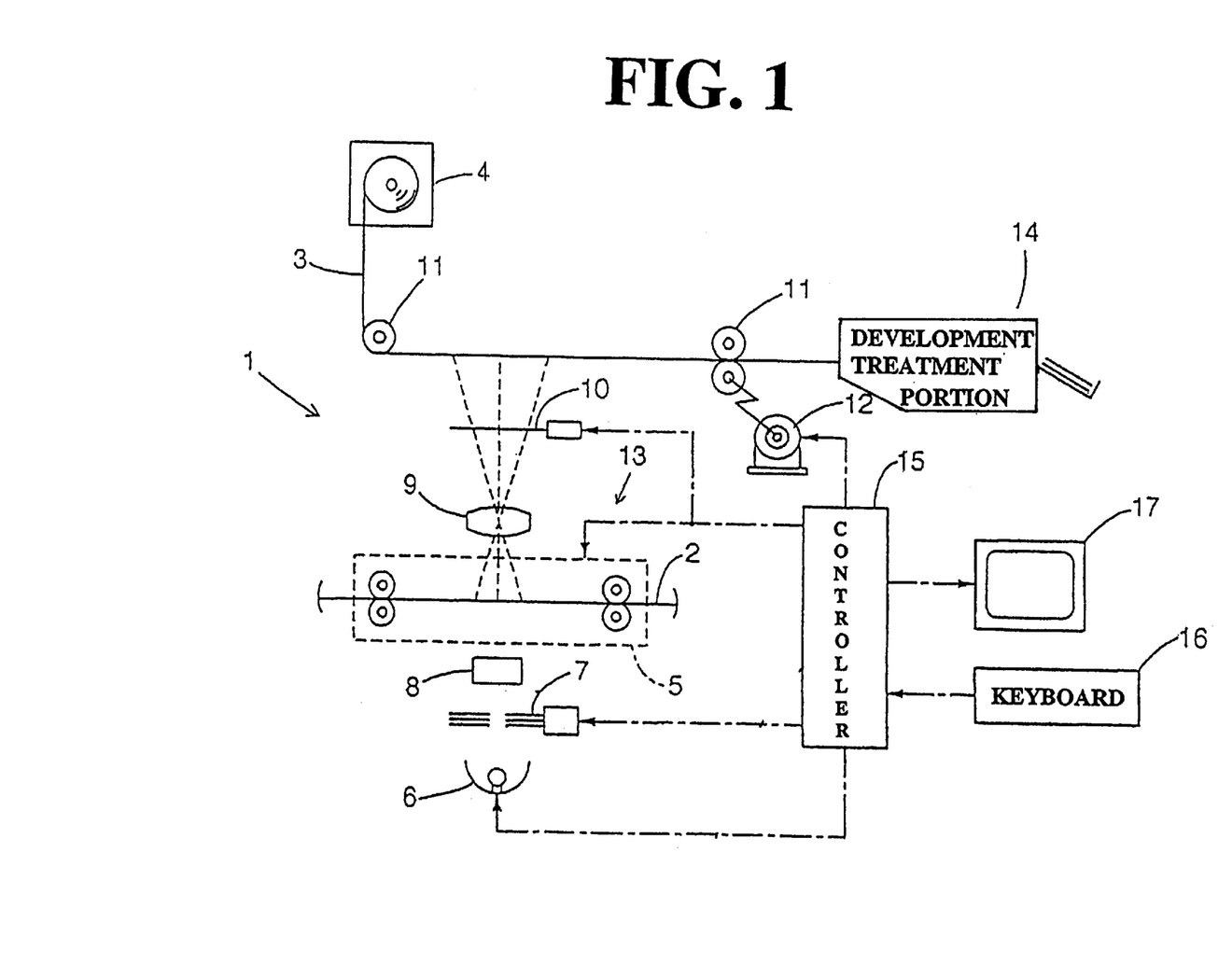
FIG. 1 is a diagrammatic view of a photographic printing apparatus in accordance with the present invention.

As shown in FIG. 1, a photographic printing apparatus 1 includes an exposure portion 13 for projecting and exposing picture information on a photographic film 2 onto a photographic printing paper 3, a development treatment portion 14 for developing the exposed printing paper 3, and a controller 15 for controlling the exposure portion 13 and the development treatment portion 14.

The controller 15 is connected to a keyboard 16 for inputting a plurality of control commands and a monitor 17 for displaying picture information which is read by a scanner portion (not shown).

After the photographic film 2 is inserted into the exposure portion 13, the picture information on the film 2 is read from each picture frame on the film 2 and is transferred to the controller 15. The controller 15 decides the exposure amount of each picture frame based on the picture information that is read from the film 2. Then, the monitor 17 displays the image which is simulated based on the determined exposure amount and this should be the same picture as the picture exposed on the printing paper 3.

An operator of the photographic printing apparatus 1 is able to input modified exposure and printing commands from the keyboard 16 when the monitor does not display a proper image. The controller 15 decides the final exposure condition with an amended exposure condition based on the modified command.

The controller 15 controls the operation of each portion of the exposure portion 13 based on the decided exposure condition and then the picture information on the film 2 is projected and exposed on the printing paper 3 withdrawn from a printing paper magazine 4.

After the printing paper 3 is finished being exposed, it is transferred to the development treatment portion 14. There it is treated with development fluid, cut into pieces corresponding to each picture frame of the film 2 and then ejected.

The exposure portion 13 has a film transfer unit 5 for transferring and positioning the film 2; a light source 6 for exposing the film; an optical filter 7 comprising yellow, magenta, and cyan filters going in and out of the exposure light path and adjusting the color balance of irradiation light from the exposure light source 6; a mirror tunnel 8 for equally mixing the color balanced light by the optical filter 7; a lens 9 for focusing and printing the picture information on the film 2 onto the printing paper 3; a shutter 10; a transfer roller 11 for transferring the printing paper 3; and a motor 12 for driving the transfer roller 11.

The optical filter 7 and the shutter 10 are controlled by the controller 15. Each filter position of the optical filter 7 and the release time of the shutter 10, the so-called exposure time, are controlled by the exposure condition decided by the controller 15.

Further, the motor 12 transfers the printing paper 3 frame by frame based on the control of the controller 15.

The development treatment portion 14 has a plurality of treatment tanks (not shown) filled with a plurality of treatment liquids for developing the exposed printing paper 3 and a cutter (not shown) for cutting the exposed printing paper 3 into pieces.

Figure 2:
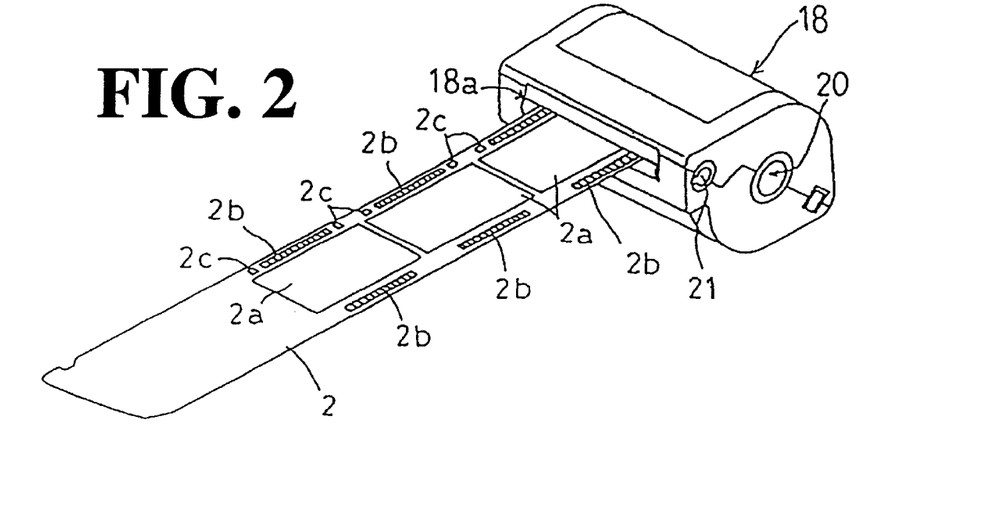
FIG. 2 is a perspective view showing a photographic film withdrawn from a film cartridge.

As shown in FIG. 2, the film 2 is used in the system, the so-called advanced photographic system, and comprises a picture area 2a for printing an image on a frame therein, a magnetic track (magnetic recording surface) 2b disposed on an upper and lower portion of the picture area 2a, and perforations 2c.

Figure 3:
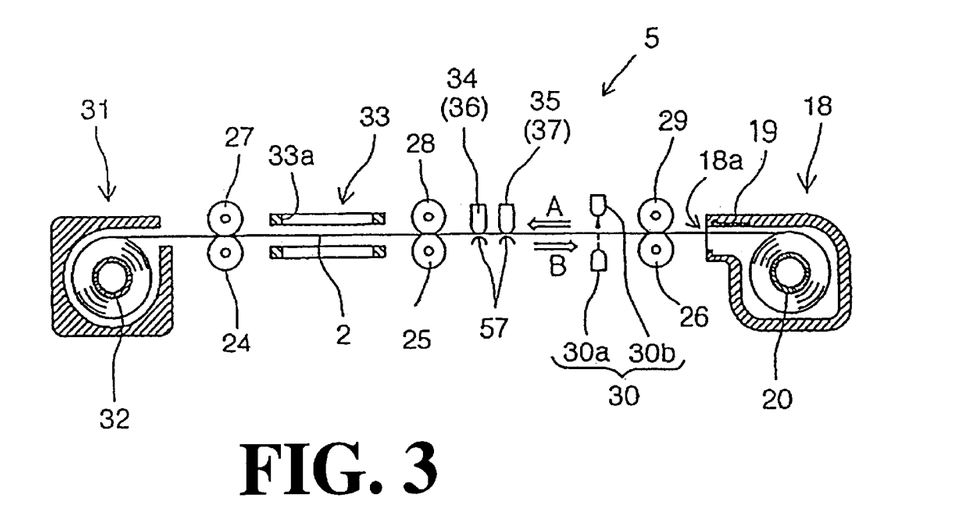
FIG. 3 is a cross sectional view showing a film transfer unit.

The film 2 is usually stored in the cartridge 18 and the film withdraw portion 18a is shaded by a light door 19 as shown in FIG. 3. After the light door 19 is opened by inserting a driving axis to a light door open and close hole 21, the film 2 is withdrawn by driving a spool 20.

FIG. 3 is a cross sectional view as well as a schematic view of the film transfer unit 5. Driving rollers 24, 25 and 26 and press rollers 27, 28 and 29 are disposed along a transfer path. A winding portion 31 is disposed at the end portion of the transfer path and winds the film 2 withdrawn from the cartridge 18 to a winding spool portion 32. An optical sensor 30 comprises a light supplying portion 30a and a light receiving portion 30b that detects optical data on the film 2. A negative mask 33 has an opening 33a defining a printing area of the picture area 2a of the film 2 for printing onto the printing paper 3.

Figure 4:
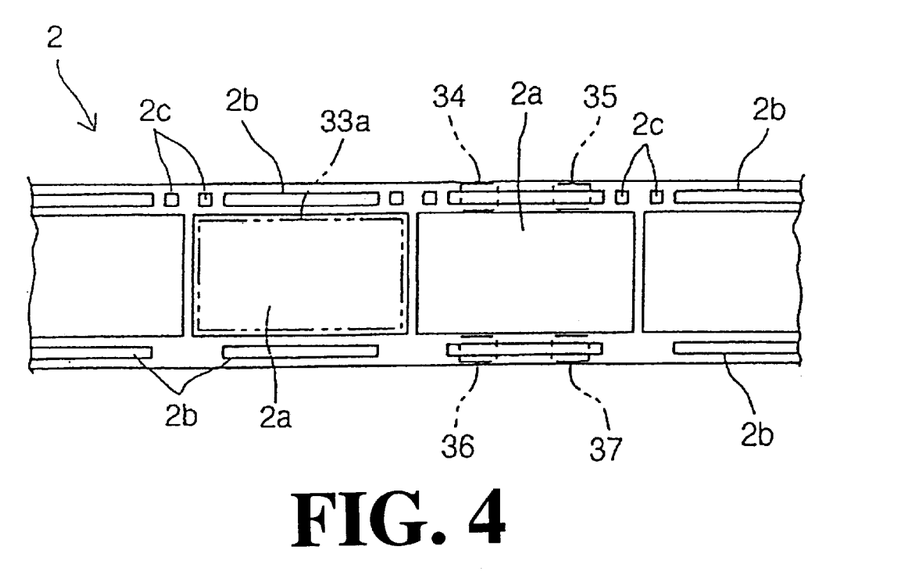
FIG. 4 is a top view showing the relative positions of a photographic film and a magnetic head.

Further, as shown in FIG. 4, disposed along the magnetic track 2b of the film 2 are magnetic heads 34 and 36 for reading data, a magnetic head 35 for writing data and a dummy head 37.

The dummy head 37 removes dust disposed on the magnetic track 2b. Thus, the reading precision of the magnetic head 36 is improved by this arrangement. Further, since bubble springs 57 are disposed on opposite sides of the magnetic heads 34, 35 and 36, a reliable contact between the magnetic heads 34, 35 and 36 and the magnetic track 2b is provided.

The film transfer unit 5 comprises an upper unit 40 and a lower unit 41, each having a frame shape and being pivotally connected to an axis 42. The upper and lower units 40 and 41 are biased toward an opening direction of the units by springs 43.

Figure 5:
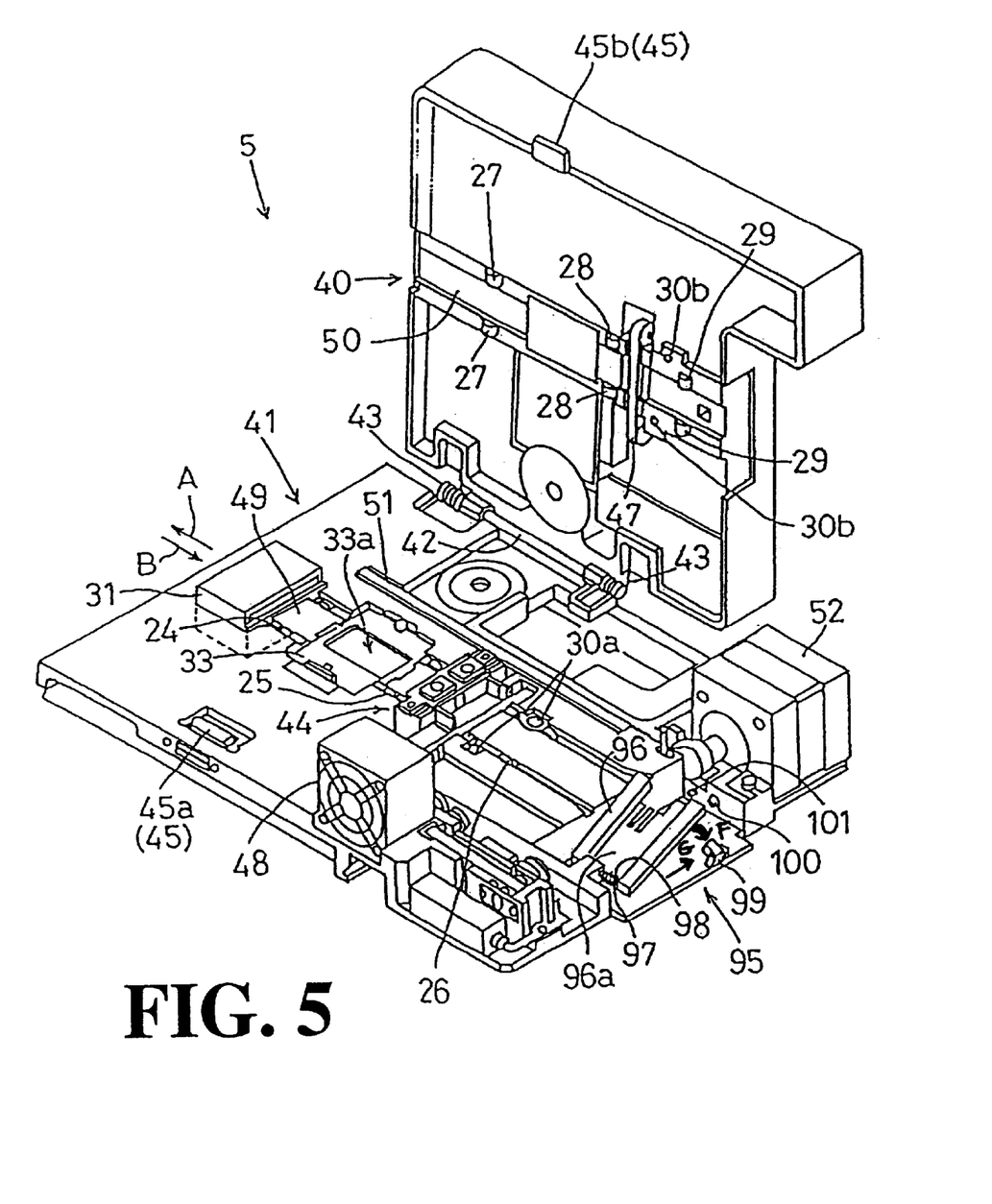
FIG. 5 is a perspective view of a film transfer unit.
Figure 6:
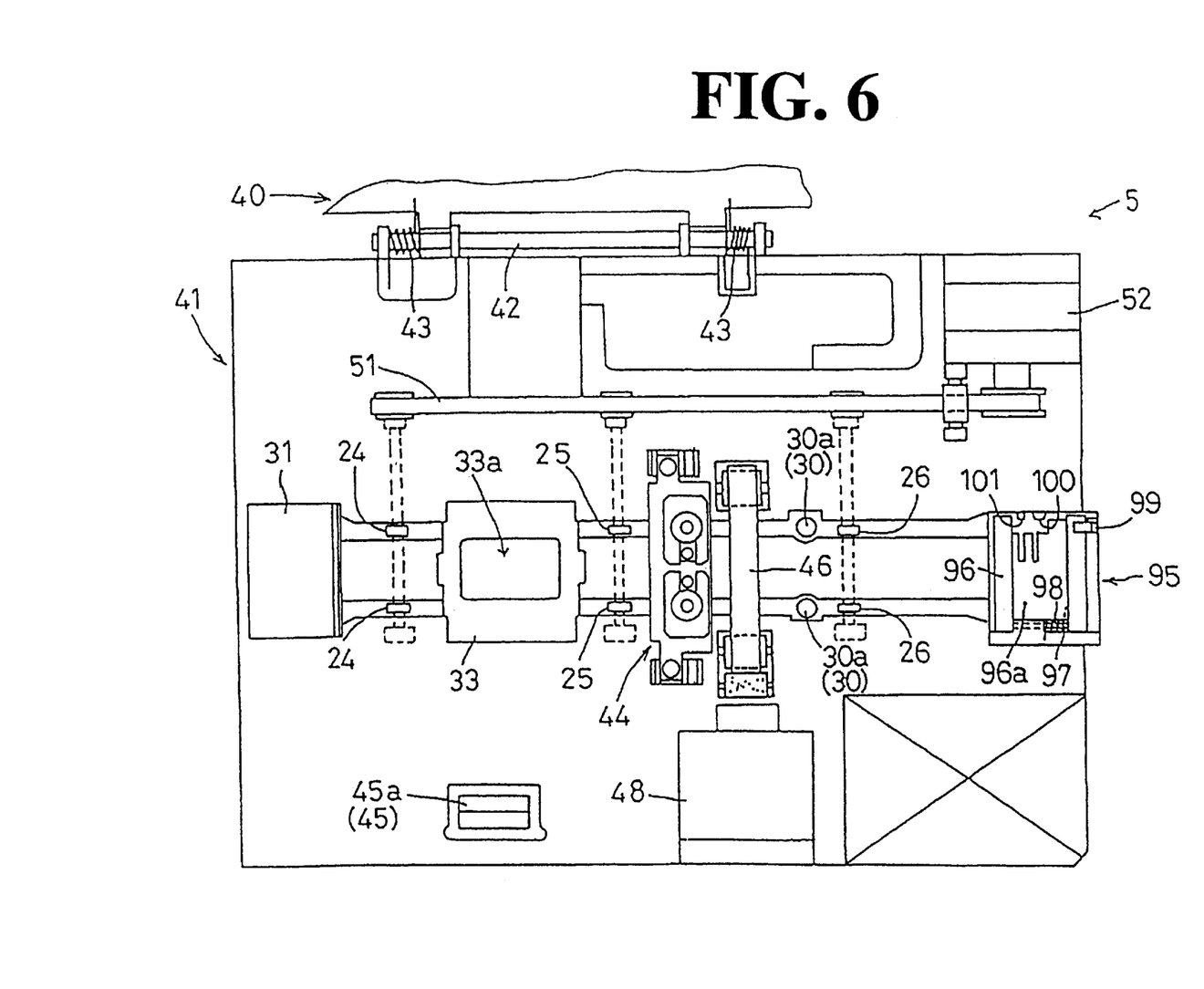
FIG. 6 is a plan view of a lower portion of the film transfer unit.

FIG. 5 shows that the upper and lower units 40 and 41 are opened and FIG. 6 shows a plan view of the lower unit 41.

The driving rollers 24, 25 and 26 are disposed to transfer the film 2. A lower guide 49 has a recess to pass a picture surface of the film 2, and supports and guides both right and left side edge portions of the film 2. A motor 52 drives the driving rollers 24, 25 and 26 by way of a belt 51. Further, the above-mentioned optical sensor 30 and the negative mask 33 are installed in the film transfer unit 5.

A magnetic head device 44 has the above-mentioned magnetic heads 34, 35 and 36, and the dummy head 37. The magnetic head device 44 reads information recorded magnetically on the magnetic track 2b of the film 2 and writes some information magnetically onto the magnetic track 2b. A detailed explanation of the structure of the magnetic head device will be omitted.

A lower cleaning belt 46 and a fan 48 function as a dust collector to remove dust disposed on the surface of the film 2. Further, a driving motor 52 moves the lower cleaning belt 46 by way of a transmission mechanism (not shown).

A cartridge loading portion 95 has a cartridge holder 96 rotatable around a supporting axis 97; a swing spring 98 for biasing the cartridge holder 96 toward the opening direction of the cartridge holder; a hook member 99 for locking the cartridge holder 96 in the closed condition; a spool supporting axis 100 and a light door driving axis 101. The cartridge holder 96 has a storage portion 96a for storing the cartridge 18.

The detailed structure of the upper unit 40 is shown in FIG. 5. A upper guide 50 is formed with a recess to pass a picture surface of the film 2, and it supports and guides both right and left sides edge portions of the film 2 with the above-mentioned lower guide 49. The pressure rollers 27, 28 and 29 are disposed on opposite sides of the driving rollers 24, 25 and 26 respectively, when the upper and lower units 40 and 41 are disposed in their closed positions, respectively. The light receiving portion 30b is disposed on an opposite side of the light supply portion 30a of the optical sensor 30. Further, the upper cleaning belt 47 is disposed on an opposite side of the lower cleaning belt 46. The upper cleaning belt 47 is driven by a motor (not shown).

The upper unit 40 is engaged with the lower unit 41 by an engaging portion 45. The engaging portion 45 comprises a hanger portion 45a formed in the lower unit 41 and a hook portion 45b formed in the upper unit 40.

The structure of the magnetic head device will now be described.

Figure 7:
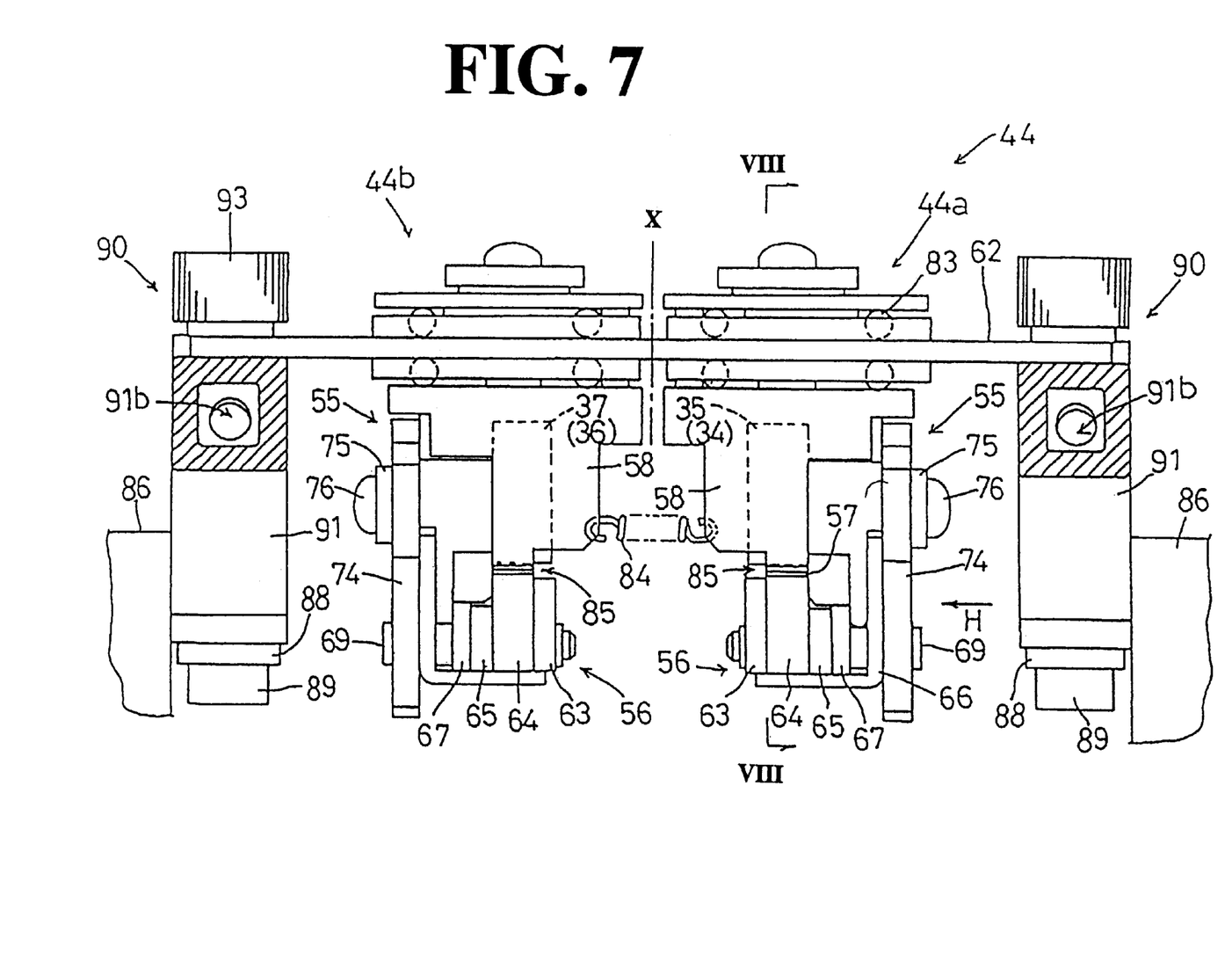
FIG. 7 is a plan and partial sectional view of a magnetic head device when viewed from upstream of a transfer path.
Figure 8:
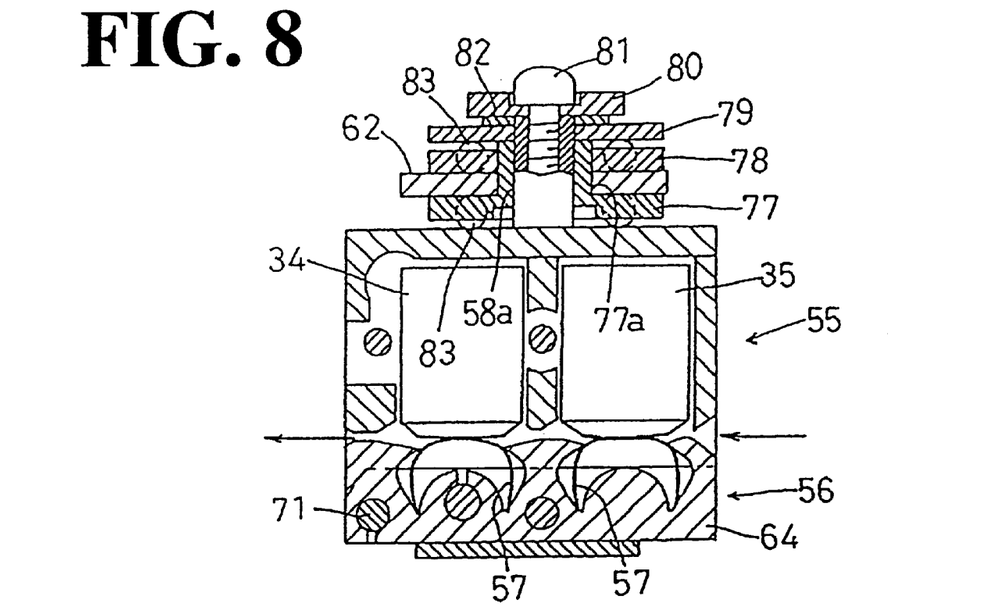
FIG. 8 is a cross sectional view taken on line VIII—VIII in FIG. 7.

FIG. 7 is a side view of the magnetic head device as viewed from upstream of the transfer path. FIG. 8 is a cross sectional view taken on line VIII—VIII of FIG. 7.

A first device 44a and a second device 44b of the magnetic head device 44 are disposed on both sides of a center line X. The first device 44a has the magnetic head 34 for reading and the magnetic head 35 for writing, and the second device has the magnetic head 36 for reading and the dummy head 37.

Since the basic structure of the first device 44a is the same as the that of the second device 44b, the first device 44a will now be described in detail below.

As shown in FIG. 8, the first device 44a has a head unit 55 for supporting the magnetic heads 34 and 35, bubble springs 57 for pressing the film 2 to the magnetic heads 34 and 35, and a pressure unit 56 for supporting the bubble springs 57.

The bubble springs 57 function as a pressure member for pressing a magnetic recording surface of the film 2 toward the magnetic heads.

Figure 9:
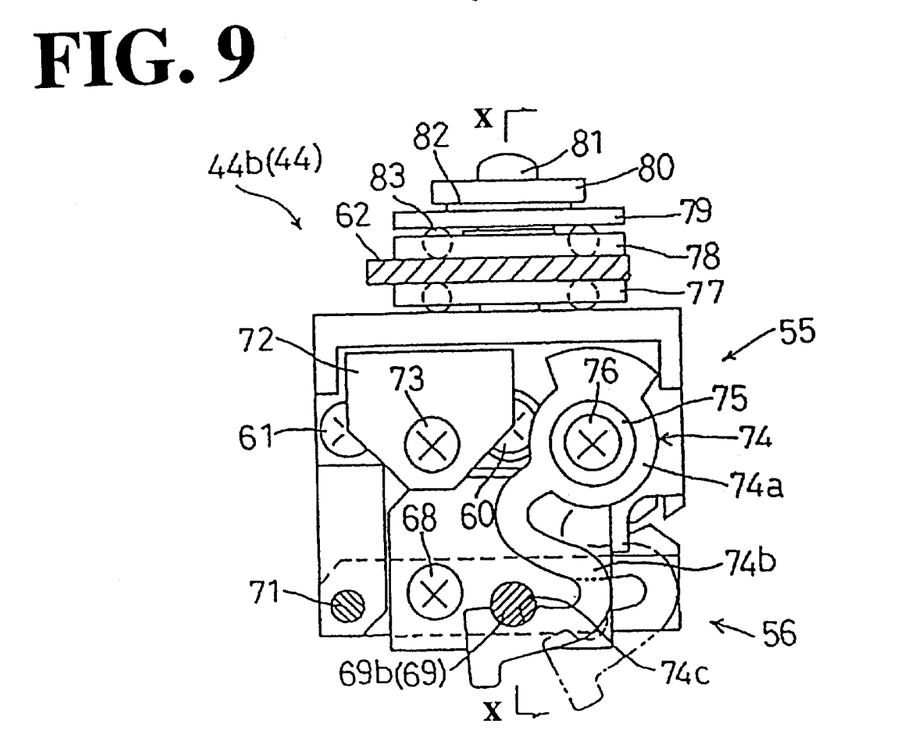
FIG. 9 is a partial sectional view taken in the direction of arrow H in FIG. 7.

FIG. 9 is a view taken in the direction of an arrow H of FIG. 7. FIG. 9 is a view showing a connecting structure of the head unit 55 and the pressure unit 56.

Figure 10:
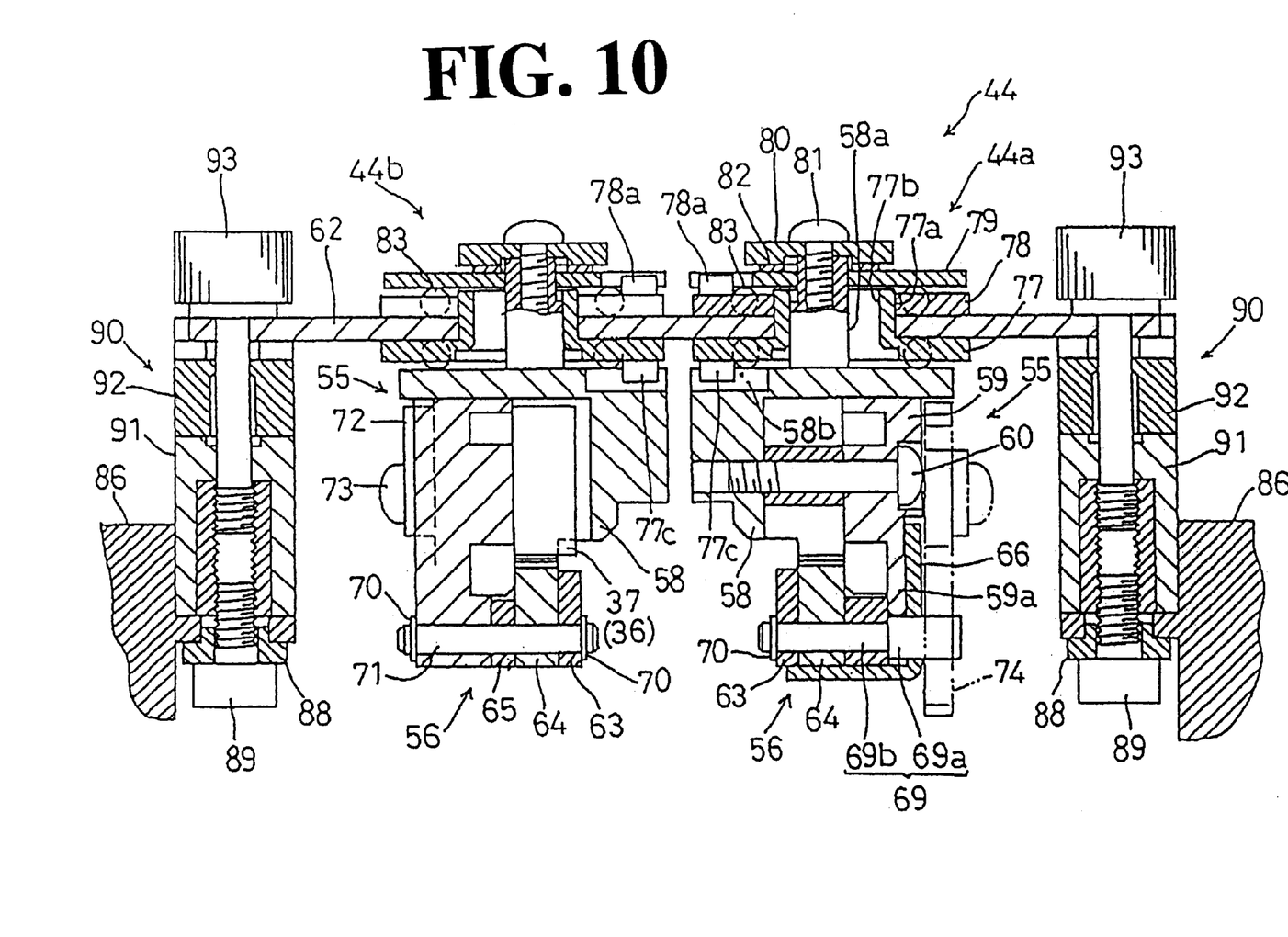
FIG. 10 is a cross sectional view of a magnetic head device viewed upstream of the transfer path.

FIG. 10 is a view showing the first device 44a on the right side of the figure and showing the second device 44b on the left side of the figure. The right side view of FIG. 10 is a cross sectional view taken on line X—X of FIG. 9 and the left side view is a cross sectional view showing a cord holder 72 and a rotational axis 71.

Further, the head unit 55 has a first block 58 and a second block 59. Both blocks 58 and 59 are fixed to each other by screws 60 and 61 as shown in FIGS. 9 and 10.

The magnetic heads 34 and 35 are attached to and supported by the first block 58. As shown in FIG. 7, the pressure unit 56 has a film guide 63 for guiding the film 2 to the magnetic heads 34 and 35; a spring holder 64 for storing and holding the bubble spring 57; a retaining plate 65 for preventing the bubble spring 57 from falling out; a shield plate 66 having an L-shape as viewed from the side and a swing block 67 for integrally connecting the above parts 63, 64, 65 and 66 with the screw 68.

Further, as shown in FIG. 10, a positioning shaft 69 is provided for positioning the film guide 63, the spring holder 64, the retaining plate 65 and the shield plate 66. The positioning shaft 69 has one large diameter portion 69a and another smaller diameter portion 69b. The one end portion of the small diameter portion 69b is held by an E-shaped ring 70.

Since a contact portion 59a of the second block 59 is contacted with the large diameter portion 69a, relative positioning accuracy between the head unit 55 and the pressure unit 56 is provided.

Figure 11:
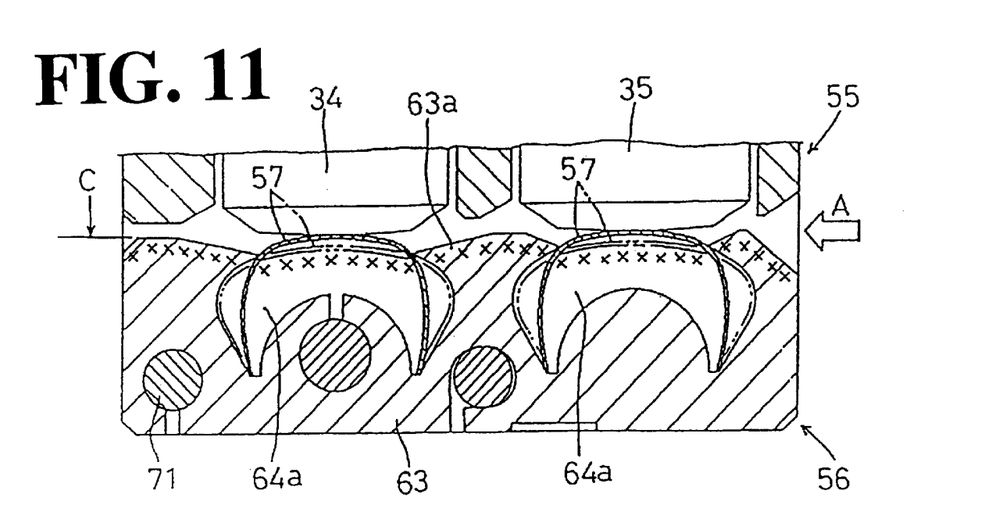
FIG. 11 is an enlarged cross sectional view of a pressure unit.

FIG. 11 shows more detailed structure of the magnetic head portion. A pair of a holding portions 64a for storing and holding the bubble springs 57 are formed.

The bubble springs 57 have a substantially C-shape. When the film 2 is not passed through the magnetic heads 34 and 35, a contact portion is contacted with the magnetic head surface by the spring force of the bubble spring 57.

An arrow C shown in FIG. 11 shows a standard surface for passing the film 2 along. The bubble spring 57 is deformed like a shape shown by the one dot line in FIG. 11, when the film 2 is transferred from the direction of arrow A.

Therefore, the contact between a magnetic track 2b of the film 2 and magnetic heads 34 and 35 can be kept quite good.

The shape of a guide surface 63a of the film guide 63 is marked with X's in FIG. 11.

As shown in FIG. 9 and FIG. 10, the head unit 55 is rotatable relative to the pressure unit 56 around the rotational axis 71. As shown in FIG. 10, the rotational axis 71 is held at both of its ends by a pair of E-shaped rings 70.

The cord holder 72 is connected to the second block 59 of the head unit 55 by a holder fixing screw 73. The cord holder 72 is for arranging cords coming out from the magnetic heads 34 and 35, but it is not always necessarily. A set spring 74 is provided to connect the head unit 55 with the pressure unit 56.

The set spring 74 comprises a fixed portion 74a fixed to the second block by a set spring fixing screw 76 with a spacer 75; a deformable portion 74b able to deform elastically and having a reverse S shape; and an engaging recess 74c for engaging the large diameter portion 69b of the positioning shaft 69.

The head unit 55 and the pressure unit 56 are engaged by the set spring 74 in FIG. 9. However, when it is carried out that the engagement of the engaging recess portion 74c is released, the head unit 55 can be rotated clockwise relative to the pressure unit 56 around the rotational axis 71 as shown in FIG. 9.

The set spring 74 is made of a composite plastic resin for easy elastic deformation.

Each head unit 55 of both the first device 44a and the second device 44b is supported by a common mount plate 62.

A supporting structure for the mount plate 62 will now be described.

Figure 12:
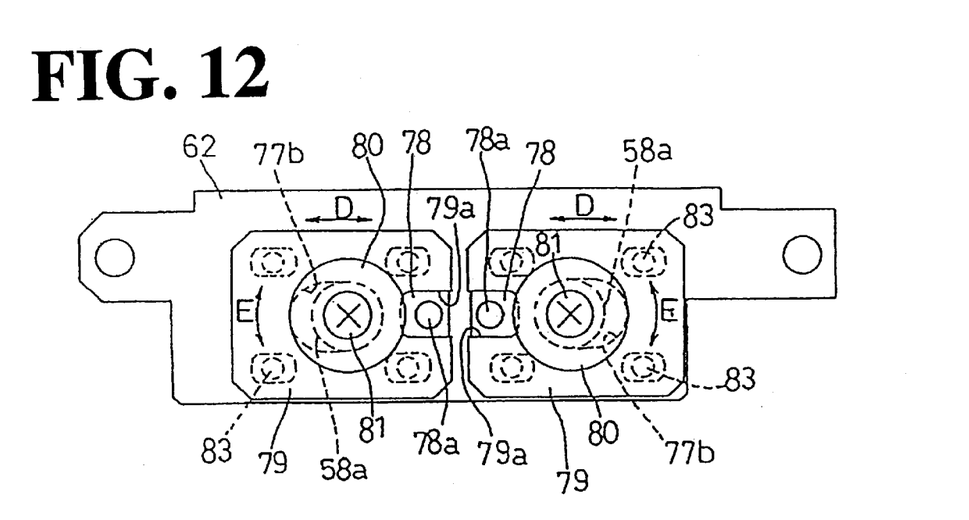
FIG. 12 is a plan view of the magnetic head device.

The mount plate 62 functions as the attachment member for attaching a pair of head units 55. FIG. 12 shows a plan view of the magnetic head device 44 and also shows the shape of the mount plate 62. A substantially cylindrical shaped boss portion 58a is provided on an upper portion of the first block 58 of the head unit 55. A lower retainer 77 and an upper retainer 78 are fixed to the mount plate 62. A boss portion 77a having a relatively large diameter is formed at a central portion of the lower retainer 77 and the upper retainer 78 is inserted into the boss portion 77a and engaged with each other by caulking, etc.

A boss portion 58a of the first block 58 is inserted into a through hole 77b formed at the center of the large boss portion 77a. As shown in FIG. 12, since the through hole 77b has an oval shape, the boss portion 58a is rotatable and also movable along the oval shape.

A sliding plate 79, a rubber 82, and a washer 80 are fixed to the upper portion of the boss portion 58a by an unit fixing screw 81.

According to the above mentioned structure, the head unit 55 is slidable in the direction of arrow D and is rotatable in the direction of arrow E shown in FIG. 12.

A boss portion 78a integrally formed on the upper retainer 78 is inserted into a U-shaped groove 79a formed in the sliding plate 79, thereby setting a rotational range of the upper retainer 78 so that the rotational range of the head unit 55 is restricted.

As shown in FIG. 10, the first block 58 has a U-shaped groove 58b and the boss 77c of the lower retainer 77 is inserted into the U-shaped groove 58b. Four steel balls 83 are provided between a lower surface of the mount plate 62 and an upper face 58c of the first block 58 and the other four balls 83 are also provided between an upper face of the mount plate 62 and a lower face of the sliding plate 79. Thereby this structure provides smooth sliding and rotational movement of the head unit 55 relative to the mount plate 62.

As shown in FIG. 7, since an extension spring 84 is hung between the first block 58 of the first device 44a and the first block 58 of the second device 44b, the head units 55 are returned to the neutral position as shown in FIG. 7, even if the head unit 55 is slid and/or rotated.

The reason why the head unit 55 and the pressure unit 56 are moved will now be described.

The film 2 is passed through a film groove 85 which is formed between the lower portion of the first block 58 and the upper portion of the spring holder 64. It is necessary to consider a serpentine motion of the film 2 while the film 2 passes through the groove 85 as well as the tolerance of the width of the film 2. However, according to the above structure, since the magnetic heads 34 through 36 can be disposed at predetermined positions from the upper and lower portions of the film 2, high precision reading and writing with any kind of transfer condition of the film 2 can be provided.

The attachment of the magnetic device 44 to the film transfer unit 5 will now be described. As shown in FIG. 10, a mounting apparatus 90 is disposed at each end of the mount plate 62.

The mounting apparatus 90 comprises a mounting position changing member 91 fixed to the base mount 86 of the film transfer unit 5 by a fixing screw 89 with a bushing 88, a rotational block 92, and a plate fixing screw 93 for fixing the mount plate 62 to the member 91.

The mounting position changing member 91 has a first screw portion 91a and a second screw portion 91b and is fixed to the base mount 86 by the first screw portion 91a and the fixing screw 89.

Figure 14:
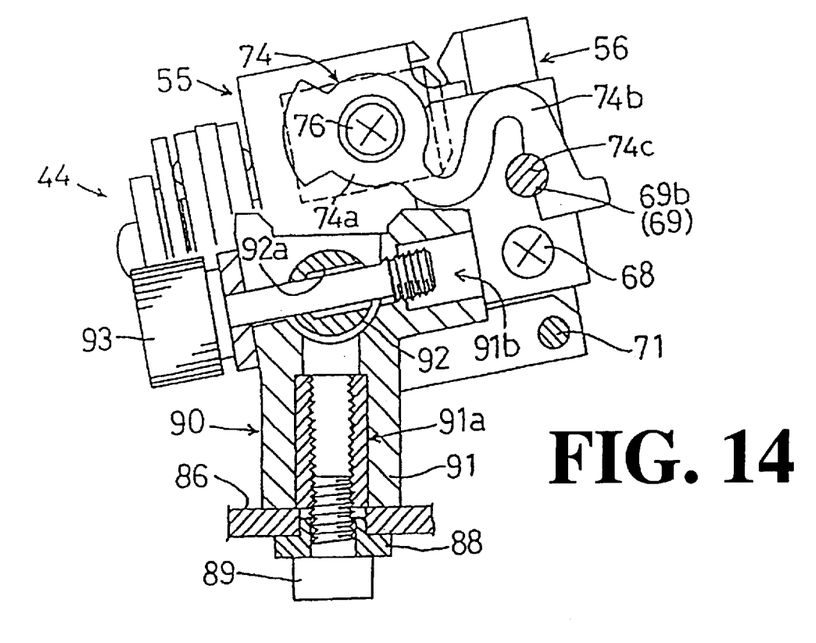
FIG. 14 is a side view showing the head unit shown in FIG. 13 moved to a second position from a first position.

Further, the magnetic head device 44 is normally set by tightening plate fixing screw 93 into the first screw portion 91a. It is also possible for the magnetic head device 44 to be secured to the second thread portion 91b by loosening the fixing screw 93 and revolving it around the rotation center of the rotation block 92 as shown in FIG. 14.

Figure 13A:
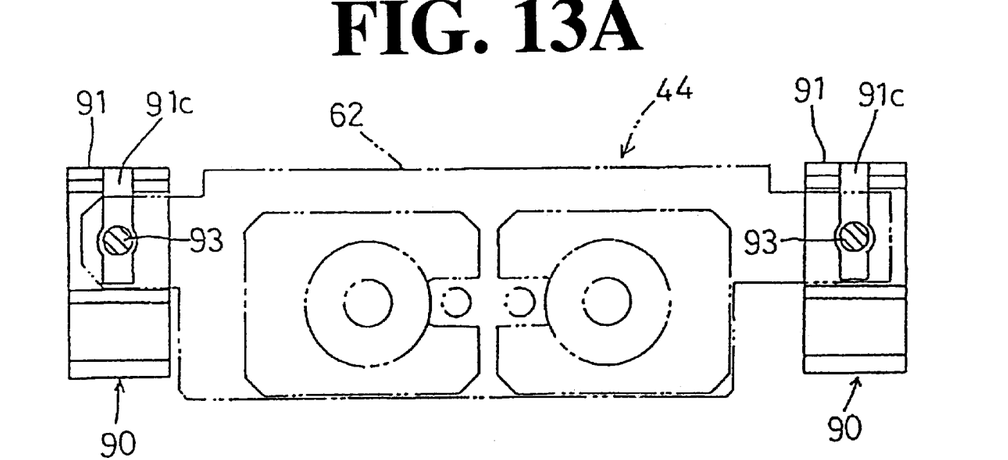
FIGS. 13A and 13B are plan and side views, respectively, showing a device for fixing a magnetic head device to the film transfer unit.

An escape zone 92a is provided in the rotational block 92 in such a way that the fixing screw 93 may escape to the escape zone 92a, when the fixing screw 93 is loosened. As shown in FIG. 13A, since a slit portion 91c is formed therein, the fixing screw 93 may be rotated.

Figure 13B:
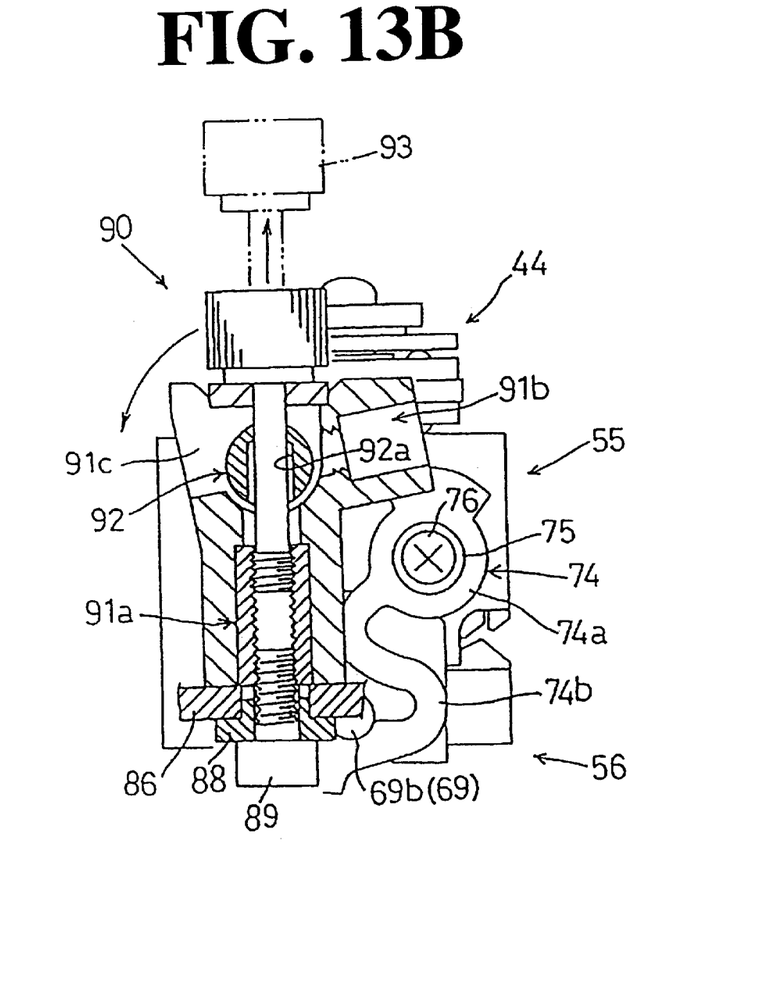

As shown in FIG. 13B, the magnetic heads 34, 35 and 36 of the head unit 55 are defined in their first positions so that they face the transfer path so that the magnetic heads 34, 35 and 36 can be read and write the magnetic data. As shown in FIG. 14, the magnetic heads 34, 35 and 36 are defined in their second positions where they are spaced away from the transfer path. Accordingly, the mounting position changing member 91 functions as the fixing member of the head unit which is capable of fixing the head unit 55 in both the first position and the second position.

The operation of the film transfer unit will now be described.

As shown in FIG. 5, after the film transfer unit 5 has been opened, the cartridge 18 is set into a cartridge holding portion 95. The setting method is such that the cartridge 18 is held in a storage portion 96a of the cartridge holder 96. After that, the cartridge holder 96 is closed (in a direction of arrow F) against to the bias force of the spring 98 for swing and then the holder 96 is moved in the direction of arrow G as shown in FIG. 5 by a spring (not shown). Then, a spool supporting shaft 100 is inserted into the spool 20 of the cartridge 18 and a light door driving shaft 101 is inserted into an opening 21 for opening and closing the light door.

In case the film transfer unit 5 is in a closed condition, the light door 19 is opened by the light door driving axis 101 based on a predetermined start signal. Then, the film 2 is withdrawn from the cartridge 18 by driving the spool 20. The withdrawn film 2 is transferred in the direction of arrow A by the driving motor 52 as shown in FIGS. 5 and 6. Further, the upper and lower cleaning belts 46 and 47 are moved so as to correspond with the withdrawing movement of the film 2 at the same time.

The withdrawn film 2 passes through a portion having the optical sensor 30, and then the recorded optical information of the film 2 is read by the optical sensor 30. Further, the film 2 passes through a space between the upper and lower cleaning belts 46 and 47 to clean dust of the film 2. Especially, the dust of the picture area 2a of the film 2 is removed by this action. The removed dust is transferred outside of the film transfer unit 5 by the fan 48.

After passing through the upper and lower cleaning belts 46 and 47, the film 2 is transferred to the magnetic head device 44 and then the magnetic data recorded on the film 2 is read by the magnetic heads 34 and 36. On the other hand, when it is necessary to write any magnetic data on the film 2, such a data is written on the film 2 by the magnetic head 35. Since the dummy head 36 is disposed upstream of the magnetic head 36, the dummy head 37 removes dust, especially any coagulated developing solution from the surface of the magnetic track 2b of the film 2. As described above, since any dust including the coagulated developing solution is removed from the film 2 prior to reading and writing of the information, the precision of reading and writing of the information is improved.

After the film 2 is transferred in the direction of arrow A as shown in FIG. 5 and all information recorded on the all pieces 2a of the film 2 is read, the film 2 is transferred to rewind to the direction of the arrow B. Then, the film 2 is transferred in the direction of arrow A again and printing and exposure are carried out on each piece 2a of the film 2 at the exposure portion 100. When the printing and exposure of the film 2 is carried out, each piece 2a of the film 2 is positioned at the opening 31a and then the exposure is carried out. In the other case, it is also preferred that the printing and exposure is carried out with the film 2 winding in the direction of arrow B. When the exposure condition is decided, the magnetic information data read from the film 2 prior to the exposure step is used.

The cleaning method of the magnetic head device 44 will now be described.

First, two of plate fixing screws 93 securing the magnetic head device 44 are loosened.

In other words, when the plate fixing screws 93 are loosened, the whole magnetic head device 44 having the head unit 55 and the pressure unit 56 integrally connected with the screw 93 are lifted up. Then, the whole device is rotated in a counterclockwise direction about 100 degrees around the rotational center of the rotational block 92c in FIG. 13B.

The fixing screw 93 is turned to screw into the second screw portion 91b (see FIG. 14).

As mentioned above, the magnetic heads 34, 35 and 36 of the head unit 55 in FIG. 14 are positioned in the second position which is spaced apart from the transfer path. However, the head unit 55 and the pressure unit 56 are still connected.

The engaging recess 74c is removed from the larger boss portion 69a of the positioning shaft 69 by operating the set spring 74 shown in FIG. 9.

Since the deformable portion 74b of the set spring 74 deforms elastically in operation, the engagement condition is released easily. Since the set springs 74 are disposed in both the first device 44a and the second device 44b respectively, both springs 74 release their engagement. The pressure unit 56 is rotated in a clockwise direction in FIG. 15 around the rotational axis 71. Thereby, the relative position between the head unit 55 and the pressure unit 56 is changed.

Figure 15:
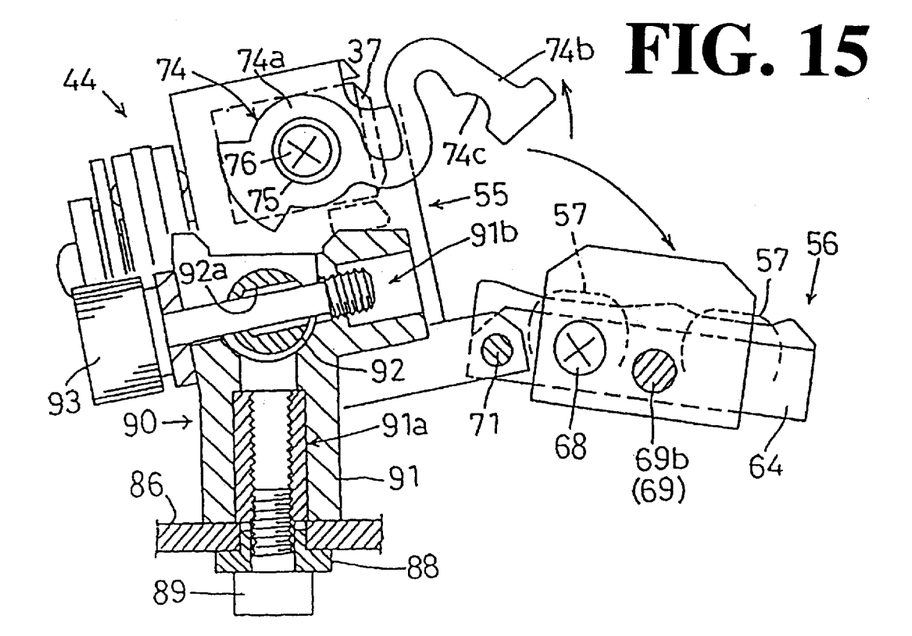
FIG. 15 is a side view showing the head unit and the pressure unit in a position for cleaning.

FIG. 13B and FIG. 14 show the first condition where the bubble springs 57 are able to contact to the magnetic heads 34, 35 and 36. FIG. 15 shows the condition where the bubble spring is spaced apart from the magnetic heads 34, 35 and 36.

Accordingly, the set spring 74 functions as the holding member to maintain the head unit 55 and the pressure unit 56 in the first condition.

In FIG. 15, the contact portions 34a and 35a of the magnetic heads 34 and 35 where they contact the film 2 are exposed. Accordingly, it is easy to clean the magnetic head by using a cotton swab permeated with alcohol. It is also possible to wipe out the other stains in addition to the stains on the magnetic heads 34 and 35.

After the cleaning is finished, the opposite procedures are used to reassemble the device.

Thus, this device makes it much easier and more convenient for handling, since the attachment of the magnetic heads 34, 35 and 36 and the bubble springs 57 have become a unit.

Further, other preferred embodiments of the present invention will now be described.

The above mentioned embodiment shows that the head unit supports two magnetic heads for reading and writing, but it is also preferred that the head unit may support only one magnetic head for reading or writing as a second embodiment.

Further, the bubble spring 57 used as the pressure member may be substituted with another member like a pad used in the prior art.

The set spring 74 functions as the holding member may also be modified to secure to the pressure unit 56 in such a way as to engage the head unit 55.

The head unit 55 may also be modified to slide relative to the pressure unit 56 instead of rotating. Also, the head unit 55 may be modified in such a way to completely separate from the pressure unit 56. In this case, the separation condition is to be the second condition.

Although the present invention has been fully described by way of example with reference to the accompanying drawings, it is to be understood that various changes and modifications will be apparent to those skilled in the art. Therefore, unless such changes depart from the scope of the invention as defined by this specification and claims, they should be construed as being included herein.

What is claimed is:

1. A magnetic head attachment structure for a photographic film comprising:

a head unit for supporting a magnetic head so as to, at least one of read and write magnetic information, to or from a photographic film;

a pressure member for pressing a magnetic record surface of the photographic film to said magnetic head;

a pressure unit for supporting said pressure member; and said pressure member having a first position substantially in contact with said magnetic head and a second position spaced apart from said magnetic head so that the relative positional relationship between said head unit and said pressure unit can change by rotational movement of at least one of said head unit and said pressure unit so that a head surface of said magnetic head is substantially exposed for cleaning.

2. A magnetic head attachment structure for a photographic film as defined in claim 1, further comprises a holding member for holding said head unit and said pressure unit at the first position and allowing movement between the first position and the second position by rotational movements of said head unit and said pressure unit.

3. A magnetic head attachment structure for a photographic film as defined in claim 2, wherein said holding member holds said head unit and said pressure unit at the first position and allows movement between the first position and the second position by operating said holding member.

4. A magnetic head attachment structure for a photographic film as defined in claim 3, wherein said holding member includes:

a fixing portion for fixing said holding member to said head unit;

an engaging portion for engaging with said pressure unit; and an elastic deformable portion for connecting said fixing portion and said engaging portion.

5. A magnetic head attachment structure for a photographic film as defined in claim 3, wherein said head unit can move from the position where said magnetic head faces a transfer path of said photographic film to the another position where said magnetic head is spaced apart from the transfer path while keeping the first position where said head unit is connected with said pressure unit.

6. A magnetic head attachment structure for a photographic film as defined in claim 5, further comprises a head unit fixing member capable of fixing said head unit at both the position where said magnetic head faces the transfer path of said photographic film and the another position where said magnetic head is spaced apart from the transfer path.

7. A magnetic head attachment structure for a photographic film as defined in claim 2, wherein said head unit is moveable between a position where said magnetic head faces a transfer path of said photographic film and another position where said magnetic head is spaced apart from the transfer path.

8. A magnetic head attachment structure for a photographic film as defined in claim 7, further comprises a head unit fixing member capable of fixing said head unit at both the position where said magnetic head faces the transfer path of said photographic film and the another position where said magnetic head is spaced apart from the transfer path.

9. A magnetic head attachment structure for a photographic film as defined in claim 8, further comprises an attachment member and a pair of said head units which are provided along a direction perpendicular to a transfer direction of a photographic film and are attached to a head unit fixing member through said attachment member.

10. A magnetic head attachment structure for a photographic film as defined in claim 2, wherein said head unit can rotate around a support shaft of said pressure unit.

11. A magnetic head attachment structure for a photographic film as defined in claim 2, wherein said head unit includes a first magnetic head for reading magnetic data and a second magnetic head for writing magnetic data.

* * * * *